UNITED STATES PATENT OFFICE.

HARRY P. WILLIS, OF WATERFORD, NEW YORK, ASSIGNOR TO WILLITE ROAD CONSTRUCTION COMPANY OF AMERICA, OF NEW YORK, N. Y.

PLASTIC COMPOSITION.

1,372,467. Specification of Letters Patent. Patented Mar. 22, 1921.

No Drawing. Application filed April 26, 1916. Serial No. 93,633.

*To all whom it may concern:*

Be it known that I, HARRY P. WILLIS, a citizen of the United States of America, and a resident of Waterford, in the county of Saratoga and State of New York, have invented a certain new and useful Plastic Composition, of which the following is a specification.

The object of my invention is to produce a plastic composition for use in the construction of roads, pavements, paving blocks, sidewalks, curbings, copings, floors, building blocks, reservoirs, drains, railroad ties, graphophone records, and other structures and articles which may advantageously be constructed of such a composition.

Briefly my invention consists of a filler, a mineral asphaltic binder and a tempering chemical compound, which, when properly united, form a plastic composition not appreciably affected by heat, cold or moisture.

The materials are used in proportions varying according to the use which is to be made of the plastic structure or article.

For instance, in building a roadway, which is usually composed of a base and a wearing surface, the base may be made according to one formula embodying the several elements, and the wearing surface be made according to another formula embodying the same or equivalent elements, having the same essential characteristics.

For the filler I use soil found at the point where the structure is to be located or nearby such a location, or I may use disintegrated stone, clay, or other filler or a mixture of them.

It will be understood, of course, that the material for the filler is practically the "general run" of soil content, or may be of the character of road material often found along a road already made—this material being commonly known as "road aggregate." The heat treatment provided in the process of preparing the filler will, of course, eliminate any inflammable matter which may be present in the soil content or the "road aggregate," the residue being employed. This use of the "general run" of soil content, or of a content of "road aggregate" origin will obviously provide variations in the characteristics of the filler, depending upon the particular locality, the ability to use a source of supply of such widely varied characteristics being made possible by the use of the remaining elements of the composition. In view of this the material for the filler can be very cheaply obtained. I am aware that clay and other various specific kinds of earthy matter have been incorporated into compositions for producing plastic structures and articles, but such uses have heretofore been largely aggregative and in compositions of a bituminous nature have failed to produce satisfactory results when exposed to elements of heat, cold or moisture. The material used for the filler is finely divided and heated and its preparation may be accomplished under a partial vacuum.

For the binder I use a mineral asphaltic material.

The tempering chemical compound is selected from the sulfids, sulfates, oxids or selenates of the basic metals, such, for instance, as the sulfates or selenates of aluminum, chromium, manganese, indium, gallium, and sulfates of selenids of sodium, potassium, rubidium, cæssium, ammonium, silver, gold, platinum or thallium. One or more of these compounds may be selected, the function of the compound being to set the binder, so as to make it practically as hard as cement concrete. In warm weather the plastic composition retains its shape and position and in cold weather remains integral. In moist weather it absorbs but a minute amount of moisture. The use of tempering chemical compounds of the characteristics of those mentioned permits the use of the cheaply obtained filler with successful results.

The binder and tempering chemical compound are preferably mixed together and heated and together mixed with the filler. The mixing may be accomplished in a partial vacuum. The binder permeates the filler thoroughly by such process and this thorough permeation permits the use of a larger quantity of filler in proportion to the other constituents and produces a materially denser product, thus increasing the adhesion of the ingredients and the strength of the product.

As a specific example of the use of my improved composition I take for the foundation or base of a roadway such as has been referred to, a mixture of eighty to ninety per cent. of finely divided soil filler. To this I add from ten to twenty per cent. of mineral asphaltic binder heated to about 110

240° F. to 350° F. and having mixed therewith from one-fourth of one per cent. to one per cent. of tempering chemical compound such as aluminum sulfate or selenate, or other chemical compound of the nature heretofore specified, the percentages of the binder and tempering compound depending on the characteristics of the particular filler used. This is about eleven per cent. in the case of a sand with little or no clay.

The wearing surface may consist of the same or similar ingredients and in the same or different proportions.

Although I have described with some detail a specific composition and method of mixture embodying my invention, it is to be understood that the invention is not restricted to the particular chemical elements, percentages or methods of mixtures mentioned. Various modifications and additions thereto may be made by those skilled in the art for mechanical and ornamental effects without departing from the spirit of my invention. I have mentioned some equivalents and others will occur to the mind.

It is also to be understood that while I have set forth the use of various common and naturally occurring materials, even to claiming an advantage in their use, it is quite within the scope of my invention to use, especially for outer or finished surfaces, prepared materials of higher grade, such as "fuller's earth," "plaster of Paris," and the like, which will give a surface free from "grit" and very smooth.

It will be observed that the use of the tempering chemical compounds referred to in combination with the fillers and binder stated, furnishes a compound which not only has a hardening action, but also prevents deterioration of bodies made of the composition through changes occasioned by climate variations.

Having thus described my invention the following is what I claim as new therein and desire to secure by Letters Patent:

1. A plastic composition comprising a relatively large proportion of a finely divided earthy filler, mineral asphalt, and sulfate of aluminum intimately combined therewith.

2. A plastic composition comprising 80 to 85 per cent. of a finely divided earthy filler, mineral asphaltum, and sulfate of aluminum.

3. A plastic composition comprising a relatively large proportion of a finely divided earthy filler, mineral asphaltum and sulfate of aluminum intimately combined therewith while in a highly heated condition.

4. A plastic composition comprising at least 80 per cent. of finely divided filler, approximately 10 per cent. of mineral asphalt and a relatively small percentage of sulfate of aluminum.

5. A method of forming a plastic composition consisting in heating a finely divided filler, adding thereto a mineral asphaltic binder heated to approximately 300 degrees Fahrenheit and sulfate of aluminum.

6. A plastic composition comprising a relatively large proportion of a finely divided earthy filler, mineral asphalt, and a salt of aluminum having tempering properties intimately combined therewith.

7. A method of forming a plastic composition consisting in heating a finely divided filler, adding thereto a mineral asphaltic binder heated to approximately 300° F. and a salt of aluminum having tempering properties.

In testimony whereof I have hereunto set my hand this 13th day of April, 1916.

HARRY P. WILLIS.